(12) United States Patent
Takata

(10) Patent No.: US 11,165,069 B2
(45) Date of Patent: Nov. 2, 2021

(54) FUEL CELL SEPARATOR, ANTIMONY-DOPED TIN OXIDE, METHOD OF MANUFACTURING THE SAME, AND METHOD OF MANUFACTURING FUEL CELL SEPARATOR

(71) Applicant: TOYOTA JIDOSHA KABUSHIKI KAISHA, Toyota (JP)

(72) Inventor: Satoshi Takata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 346 days.

(21) Appl. No.: 16/365,009

(22) Filed: Mar. 26, 2019

(65) Prior Publication Data

US 2019/0326609 A1 Oct. 24, 2019

(30) Foreign Application Priority Data

Apr. 23, 2018 (JP) .............................. JP2018-082271

(51) Int. Cl.
*H01M 8/0215* (2016.01)
*H01M 8/0228* (2016.01)

(52) U.S. Cl.
CPC ....... *H01M 8/0215* (2013.01); *H01M 8/0228* (2013.01)

(58) Field of Classification Search
CPC .......................... H01M 8/0228; H01M 8/0215
See application file for complete search history.

(56) References Cited

U.S. PATENT DOCUMENTS

2007/0298309 A1 12/2007 Vyas et al.

FOREIGN PATENT DOCUMENTS

| CN | 108532285 A | * | 9/2018 |
|---|---|---|---|
| JP | 2007-311137 A | | 11/2007 |
| JP | 2008-021647 A | | 1/2008 |
| JP | 2008-091101 A | | 4/2008 |
| JP | 2008189541 A | * | 8/2008 |

* cited by examiner

*Primary Examiner* — Jonathan G Jelsma
(74) *Attorney, Agent, or Firm* — Sughrue Mion, PLLC

(57) ABSTRACT

A fuel cell separator having high corrosion resistance and electrical conductivity is provided. This fuel cell separator includes, on a substrate, an antimony-doped tin oxide film having an alkyl group substituted with at least one fluorine atom, in which an element ratio of fluorine to tin (F/Sn) in the film is 3 or more and 7 or less.

6 Claims, 2 Drawing Sheets

FUEL CELL SEPARATOR, ANTIMONY-DOPED TIN OXIDE, METHOD OF MANUFACTURING THE SAME, AND METHOD OF MANUFACTURING FUEL CELL SEPARATOR

CROSS REFERENCE TO RELATED APPLICATIONS

This application is based upon and claims the benefit of priority from Japanese patent application No. 2018-82271, filed on Apr. 23, 2018, the disclosure of which is incorporated herein in its entirety by reference.

BACKGROUND

The present disclosure relates to a fuel cell separator, an antimony-doped tin oxide, a method of manufacturing the same, and a method of manufacturing the fuel cell separator.

A separator used for a fuel cell that has a concavo-convex shape formed by press working or the like has been known. This separator is arranged on a gas diffusion layer of a membrane electrode assembly, which forms a unit cell. A surface of this separator on the side of the gas diffusion layer forms a gas surface that forms a flow path of reactive gas or the like and another surface thereof forms a cooling surface that forms a flow path of cooling water or the like. Further, this separator typically has electrical conductivity in order to draw electric power obtained from the unit cell.

Further, it is required that the separator have corrosion resistance against hydrofluoric acid-based acid generated in the membrane electrode assembly.

Japanese Unexamined Patent Application Publication No. 2008-21647 discloses a method of depositing an electrically conductive and hydrophilic layer on a bipolar plate substrate for a fuel cell, which corresponds to a separator. According to Japanese Unexamined Patent Application Publication No. 2008-21647, water transport is improved by depositing a hydrophilic layer. When the surface of the separator is made hydrophilic as in Japanese Unexamined Patent Application Publication No. 2008-21647, however, acid easily permeates the separator, which may cause a decrease in the corrosion resistance of the separator.

Japanese Unexamined Patent Application Publication No. 2007-311137 discloses a separator for a fuel cell including a noble metal plating film formed on a surface of a separator substrate made of stainless steel and a carbon-containing coating film formed on the noble metal plating film by an aerosol deposition method as a separator for a fuel cell having low surface resistance, low contact resistance, and corrosion resistance capable of withstanding strongly acidic atmosphere.

SUMMARY

Since the noble metal coating film is formed in the method disclosed in Japanese Unexamined Patent Application Publication No. 2007-311137, the manufacturing cost is high. Further, since the productivity of the aforementioned method of forming the carbon-containing coating film on the noble metal coating film is low, more productive methods have been demanded.

The present disclosure has been made in view of the aforementioned circumstances and aims to provide a fuel cell separator with high corrosion resistance and high electrical conductivity, a method of manufacturing the same, an antimony-doped tin oxide suitable for the manufacturing of the fuel cell separator, and a method of manufacturing the same.

A fuel cell separator according to this embodiment includes, on a substrate, an antimony-doped tin oxide film having an alkyl group substituted with at least one fluorine atom, in which an element ratio of fluorine to tin (F/Sn) in the film is 3 or more and 7 or less.

An antimony-doped tin oxide according to this embodiment includes a partial structure represented by the following formula (1):

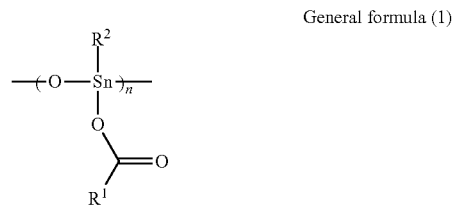

General formula (1)

(in the general formula (1), $R^1$ represents an alkyl group which may be substituted with a halogen atom, $R^2$ is a substituent represented by —O—Sn or —O—C(=O)—$R^1$, and n is an integer equal to or larger than 1. When there are a plurality of $R^1$ and a plurality of $R^2$, the plurality of $R^1$ and the plurality of $R^2$ may be the same or different from each other. However, at least one fluorine atom is included in the structure represented by the formula (1)).

A method of manufacturing an antimony-doped tin oxide according to this embodiment includes mixing alkyl acid substituted with at least one fluorine atom, tin chloride, and antimony chloride into water.

A method of manufacturing a fuel cell separator according to this embodiment including, on a substrate, an antimony-doped tin oxide film including an alkyl group substituted with at least one fluorine atom is provided, in which an element ratio of fluorine to tin (F/Sn) in the film is 3 or more and 7 or less, the method including: preparing particles of the antimony-doped tin oxide according to this embodiment; and spraying the particles onto the substrate and forming a film by aerosol deposition.

According to the present disclosure, it is possible to provide a fuel cell separator with high corrosion resistance and high electrical conductivity, a method of manufacturing the same, an antimony-doped tin oxide suitable for the manufacturing of the fuel cell separator, and a method of manufacturing the same.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
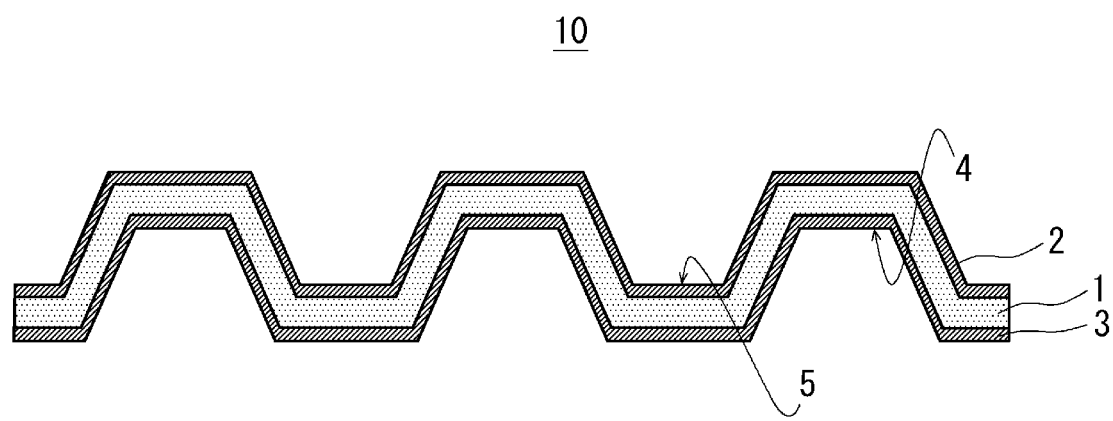
FIG. 1 is a schematic cross-sectional view showing one example of a fuel cell separator according to this embodiment.

Referring to FIG. 1, an outline of a fuel cell separator according to this embodiment will be explained. A fuel cell separator 10 as shown in the example of FIG. 1 includes antimony-doped tin oxide (ATO) films (2 and 3) on a substrate 1.

Figure 2:
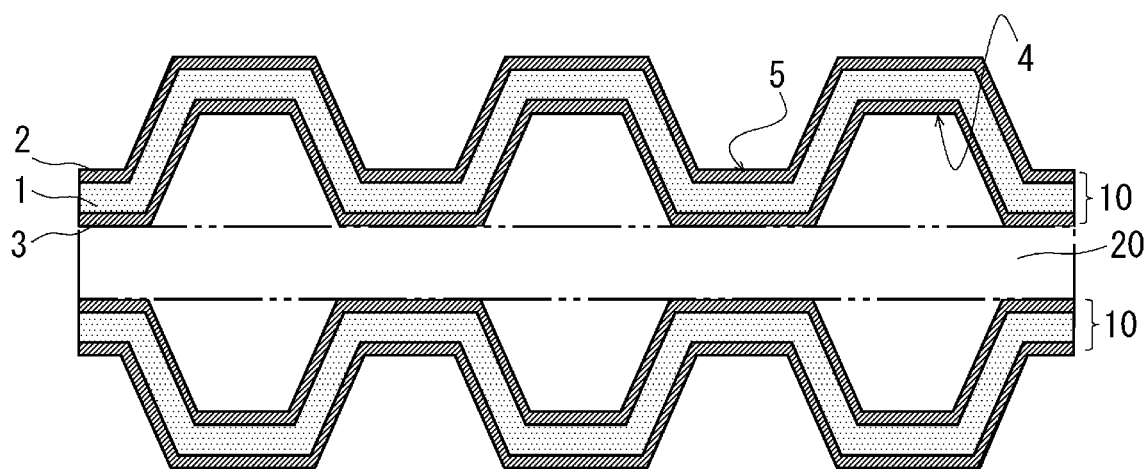
FIG. 2 is a schematic cross-sectional view showing one example of a usage state of the fuel cell separator according to this embodiment.

The fuel cell separator 10 according to this embodiment includes, as shown in the example of FIG. 2, gas surfaces 4 disposed in a gas diffusion layer included in a membrane electrode assembly 20 in such a way that the gas surfaces 4 are opposed to each other, which forms a gas flow path, and has electrical conductivity to draw electric power obtained from the membrane electrode assembly 20.

Figure 3:
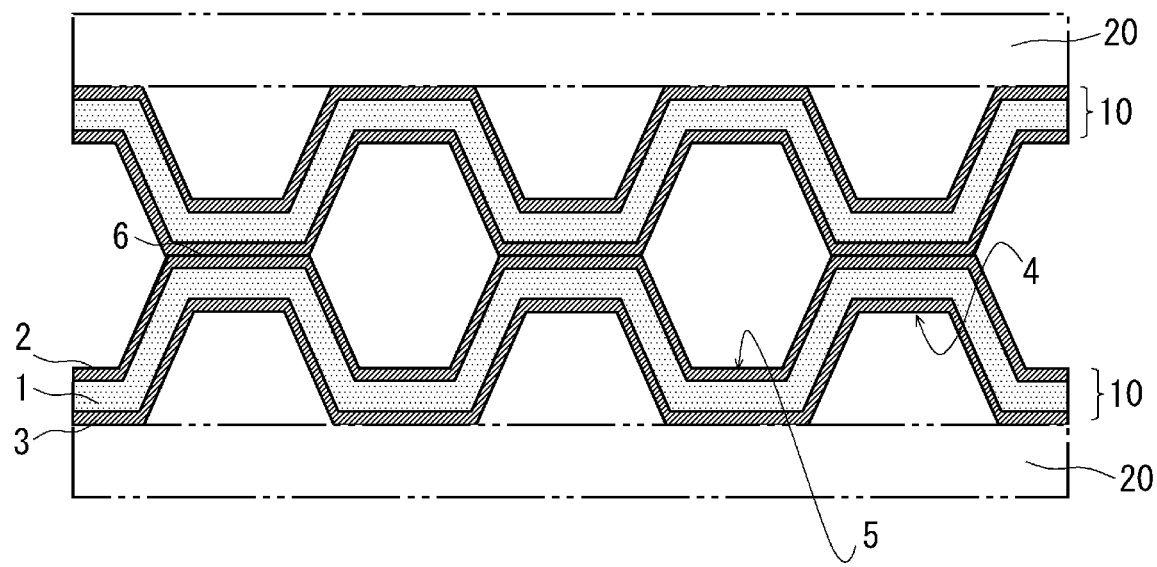
FIG. 3 is a schematic cross-sectional view showing one example of a contact of fuel cell separators.

The fuel cell typically has a stack structure in which the membrane electrode assemblies 20 are stacked on one another in order to obtain a necessary voltage. When the membrane electrode assemblies 20 are stacked on one another as shown in the example of FIG. 3, at least some of cooling surfaces 5 come in contact with each other in the fuel cell separator 10, whereby a contact part 6 is formed.

The fuel cell separator according to this embodiment includes an ATO film having an alkyl group substituted with at least one fluorine atom, and the element ratio of fluorine to tin (F/Sn) in this film is 3 or more and 7 or less. Therefore, the fuel cell separator according to this embodiment has high corrosion resistance against acid and has high electrical conductivity even after a severe test using acid.

The material of the substrate 1 that composes the separator is not particularly limited, and can be selected as appropriate from among known materials used for a fuel cell separator. Examples thereof are a plastic material, a metallic substrate or the like. A metallic substrate is preferably used from the viewpoint of high corrosion resistance, high electrical conductivity and the like. The metal used for the metallic substrate may be, for example, iron, titanium, aluminum or an alloy such as stainless, but is not limited thereto. The metal is preferably titanium or stainless in view of corrosion resistance and is preferably stainless from the viewpoint of easy availability or the like. When stainless is used, it is preferably used after an oxidized film on the surface thereof is removed in view of electrical conductivity.

The shape of the substrate may be a desired shape in accordance with the design of the fuel cell. The shape of the separator may be, for example, the one that includes a gas surface 4 where a gas flow path can be formed on the side of the membrane electrode assembly 20 and a cooling surface 5 where a flow path of a refrigerant or the like can be formed on the surface on the opposite side of the gas surface 4.

The thickness of the substrate may be selected as appropriate to the extent that gas blocking property and electrical conductivity are secured, and may be, for example, 0.05 mm-0.2 mm, and preferably 0.1 mm.

The ATO film according to this embodiment includes an antimony-doped tin oxide having an alkyl group substituted with at least one fluorine atom.

Since the antimony-doped tin oxide according to this embodiment includes the alkyl group substituted with at least one fluorine atom, it is estimated that water repellency of the antimony-doped tin oxide particles becomes high and permeability of acid becomes low, which results in the corrosion resistance to acid to be improved.

The aforementioned alkyl group is preferably an alkyl group having a carbon number of 1 or more and 6 or less, more preferably, an alkyl group having a carbon number of 1 or more and 4 or less, and further preferably, an alkyl group having a carbon number of 3. Specific examples of the alkyl group may include a methyl group, an ethyl group, a propyl group, a butyl group, a pentyl group, or a hexyl group. Since the carbon number is equal to or smaller than the above upper-limit value, inhibition of binding of tin oxide particles at the time of film forming can be suppressed.

A hydrogen atom in the alkyl group may be substituted with a halogen atom. The halogen atom includes a fluorine atom, a chlorine atom, a bromine atom, or an iodine atom. In this embodiment, at least one of the hydrogen atom of the alkyl group is substituted with the fluorine atom.

In this embodiment, a fluoroalkyl group, in which all the hydrogen atoms of the alkyl group are substituted with fluorine atoms, is preferably used. The fluoroalkyl group may be a trifluoromethyl group, a pentafluoroethyl group, a heptafluoropropyl group or the like.

The ATO film may be formed on both surfaces of the substrate, as shown in FIG. 1, may be formed only on the side of the gas surface 4 of the substrate, or may be formed in at least a part of the substrate. In this embodiment, the ATO film is preferably formed on both surfaces of the substrate in view of corrosion resistance and electrical conductivity.

The method of manufacturing the fuel cell separator according to this embodiment is not particularly limited, and may be any method by which the aforementioned specific ATO film can be formed. In the following description, a preferable method of manufacturing the fuel cell separator according to this embodiment will be explained.

The preferable method of manufacturing the fuel cell separator according to this embodiment includes a process of preparing particles of an antimony-doped tin oxide including a partial structure represented by the following formula (1) and a process of spraying the particles onto the substrate to form a film by aerosol deposition.

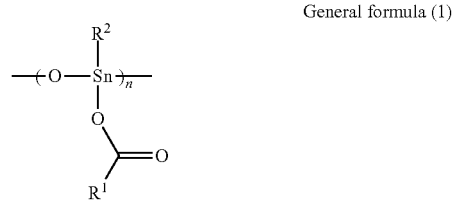

General formula (1)

(In the general formula (1), $R^1$ represents an alkyl group which may be substituted with a halogen atom, $R^2$ is a substituent represented by —O—Sn or —O—C(=O)—$R^1$, and n is an integer equal to or larger than 1. When there are a plurality of $R^1$ and a plurality of $R^2$, the plurality of $R^1$ and the plurality of $R^2$ may be the same or different from each other. However, at least one fluorine atom is included in the structure represented by the general formula (1)).

The antimony-doped tin oxide including the partial structure represented by the above general formula (1), which is the one in which an alkyl group having at least one fluorine atom is introduced into a part of tetravalent tin oxide that forms a crystal structure, reduces the surface energy of the antimony-doped tin oxide particles. Therefore, water repellency of antimony-doped tin oxide particles is improved, which causes corrosion resistance against acid to be improved.

The alkyl group in $R^1$ in the above general formula (1) may be similar to the aforementioned alkyl group. The symbol $R^2$ in the general formula (1) is a substituent represented by —O—Sn or —O—C(=O)—$R^1$. When $R^2$ is —O—Sn, this Sn may be further coupled to oxygen atoms or the like to form a crystal structure of tin oxide. When $R^2$ is —O—C(=O)—$R^1$, $R^1$ is as described above.

The symbol n in the general formula (1) is an integer equal to or larger than one, which means that only one structure represented by the general formula (1) or two or more structures may be included in a crystal of the tin oxide, and n is not particularly limited.

A preferable manufacturing method of the antimony tin oxide including the partial structure represented by the above general formula (1) includes a process of mixing alkyl acid substituted with at least one fluorine atom, tin chloride, and antimony chloride into water.

The tin chloride is preferably tetravalent tin chloride ($SnCl_4$). Tetravalent tin chloride reacts with water, whereby tin oxide ($SnO_2$) can be easily formed, and alkyl acid is introduced into a part thereof at the time of reaction. Further, by using tin chloride, alkyl acid is introduced more easily than a case in which organic tin is used.

Antimony chloride is preferably pentavalent antimony chloride ($SbCl_5$). This antimony chloride forms antimony trioxide ($Sb_2O_3$) in water.

The aforementioned water is a reaction medium, and reacts with tin chloride or antimony chloride as described above. Since tin chloride generates hydrogen chloride when it reacts with water, sodium hydroxide or potassium hydroxide may be added to the water.

Further, alkyl acid introduces —O—C(=O)—$R^1$ into tin atoms, and specific examples thereof include trifluoroacetic acid, pentafluoropropionic acid, and heptafluorobutyric acid.

The method of mixing alkyl acid, tin chloride, and antimony chloride into water is not particularly limited. Each of the substances may be sequentially added to water. An alcohol solution in which alkyl acid, tin chloride, and antimony chloride are added to a solvent is preferably prepared, and this alcohol solution is preferably dropped into water in order to cause a mild reaction.

The above solvent is an organic solvent in order to prevent a reaction from proceeding. This solvent is preferably an alcohol solvent from the viewpoint of high affinity with water, more preferably, methanol or ethanol since it can be easily dried and removed after the reaction, and further preferably, ethanol.

Since the antimony-doped tin oxide including the partial structure represented by the general formula (1) obtained from the above process precipitates, by filtering the obtained solution, and washing and drying the residue, a particle-shaped antimony-doped tin oxide can be obtained.

The percentage of antimony in the antimony-doped tin oxide may be, for example, but not limited to, 0.2-10 atom % (atm. %).

Next, the particles are sprayed onto the substrate to form a film by aerosol deposition. The aerosol deposition is a method of mixing the particles into gas to form an aerosol and spraying it onto a substrate through a nozzle to form a film. The aerosol deposition may be executed using a commercially available device or the like. When a stainless substrate is used as the substrate, the particles may be sprayed at a low speed and a passive film (oxidized film) may be removed in view of electrical conductivity.

While the thickness of the ATO film is not particularly limited, it is preferably about 0.1 μm in view of electrical conductivity and corrosion resistance.

EXAMPLES

Hereinafter, this embodiment will be explained in detail with reference to Examples and Comparative Examples. However, this embodiment is not limited to the following Examples.

Example 1

(1) Manufacturing of Antimony-Doped Tin Oxide

Heptafluorobutyric acid, tin chloride, and antimony chloride were mixed in such a way that the element ratio of fluorine to tin (F/Sn) becomes 3, whereby an ethanol solution was prepared.

Next, the aforementioned ethanol solution was dropped into a potassium hydroxide aqueous solution. Next, the solution after the dropping was filtered, and then the residue was dried at 100° C. Then the obtained dried solid-matter was crushed, whereby antimony-doped tin oxide particles having the partial structure represented by the general formula (1) were manufactured.

(2) Forming of Antimony-Doped Tin Oxide Film

The antimony-doped tin oxide particles obtained by the above (1) were aerosolized, then these particles were sprayed onto a stainless (SUS447) substrate (having a thickness of 0.1 mm) at a low speed and the passive film was removed, and then these particles were sprayed at a high speed, whereby the ATO film was formed.

Examples 2-4, Comparative Examples 1-3

Antimony-doped tin oxide particles having the partial structure represented by the general formula (1) were manufactured in a way similar to that in Example 1 except that the element ratio of fluorine to tin (F/Sn) was changed to 4, 5.5, 7, 8, and 10 in (1) of the Example 1.

Next, similar to (2) in the Example 1, the ATO film according to Examples 2-4 and Comparative Examples 1-3 was formed.

Comparative Example 4

Antimony-doped tin oxide particles that do not include the partial structure represented by the general formula (1) were manufactured in a way similar to that in Example 1 except that heptafluorobutyric acid was not contained in (1) of the Example 1.

Next, the ATO film according to a comparative example 4 was formed in a way similar to that in (2) according to the Example 1.

<Anticorrosion Test>

An anticorrosion test was performed by a constant potential corrosion test in accordance with an electrochemical high temperature corrosion test method for metal materials (JIS Z2294) specified in Japanese Industrial Standards.

The substrate in which the ATO film was formed in the aforementioned Examples and comparative examples was immersed in a sulfuric acid aqueous solution at 80° C., and the potential was kept constant at 0.9V vs SHE (standard electrode potential) in this state. Sodium fluoride (NaF) was dissolved in the sulfuric acid aqueous solution in such a way that the fluoride ion concentration became 3000 ppm. The time for the test was set to 100 hours.

A gold-plated copper plate was placed onto the surface of the substrate on the side of the ATO film after being subjected to the anticorrosion test, a carbon paper (TGP-H-120 manufactured by Toray Industries, Inc.) was put between the substrate and the copper plate, and a voltage value between the antimony-doped tin oxide film surface and the carbon paper when a constant current was applied between the substrate and the copper plate while applying pressure of 0.98 MPa was measured, whereby a resistance value was calculated.

<Measurement of Element Ratio of Film>

Figure 4:
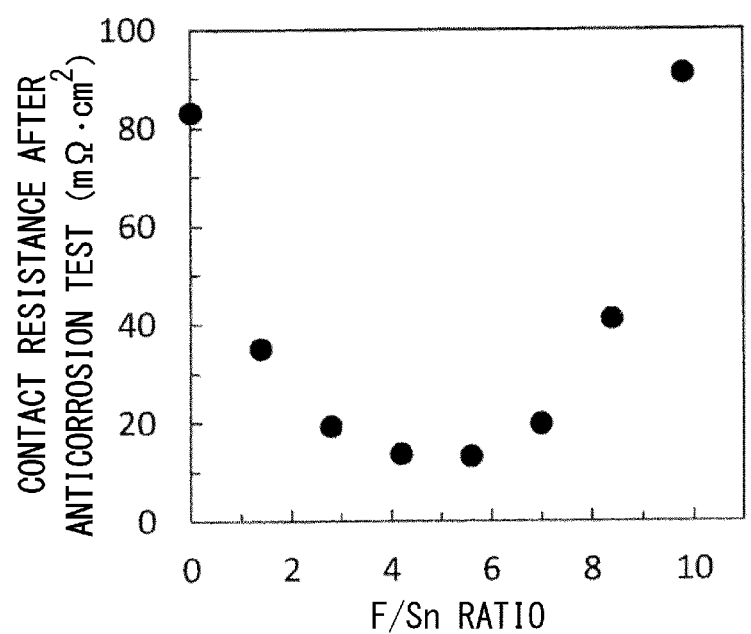
FIG. 4 is a graph showing a relation between an element ratio of fluorine to tin (F/Sn) in a film and contact resistance after an anticorrosion test.

The ATO films according to the Examples and the comparative examples were measured by X-ray photoelectron spectroscopy (XPS) and thus the element ratio of fluorine to tin (F/Sn) was calculated. FIG. 4 shows a relation between the element ratio and contact resistance after the anticorrosion test.

[Summary of Results]

As shown in FIG. 4, in the range in which the F/Sn ratio in the ATO film is from 3 to 7, it has been revealed that the contact resistance is lower than 20 m$\Omega \cdot$cm$^2$ and the electrical conductivity is high. In the range in which the F/Sn ratio is less than 3, it can be estimated that water repellency of a tin oxide grain boundary is low, and acid easily erodes the tin oxide particles, which causes a decrease in the corrosion resistance. On the other hand, when the F/Sn ratio exceeds 7, it can be estimated that the binding of the tin oxide particles is inhibited by fluorine atoms, and tin oxide particles remain to be powder, tin oxide particles are easily fallen off from the substrate, which results in a decrease in the corrosion resistance.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A fuel cell separator comprising, on a substrate, an antimony-doped tin oxide film having an alkyl group substituted with at least one fluorine atom,
    wherein an element ratio of fluorine to tin (F/Sn) in the film is 3 or more and 7 or less.

2. The fuel cell separator according to claim 1, wherein the substrate comprises two surfaces, and the antimony-doped tin oxide film is formed on both of the two surfaces.

3. The fuel cell separator according to claim 1, wherein the antimony-doped tin oxide film comprises particles of an antimony-doped tin oxide including a partial structure represented by the following Formula (1):

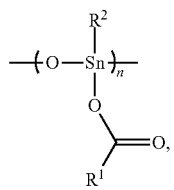

Formula (1)

wherein, in the Formula (1), R$^1$ represents an alkyl group which may be substituted with a halogen atom, R$^2$ is a substituent represented by —O—Sn or —O—C(=O)—R$^1$, and n is an integer equal to or larger than 1, when there are a plurality of R$^1$ and a plurality of R$^2$, the plurality of R$^1$ and the plurality of R$^2$ may be the same or different from each other, with the proviso that at least one fluorine atom is included in the structure represented by the Formula (1).

4. An antimony-doped tin oxide including a partial structure represented by the following Formula (1):

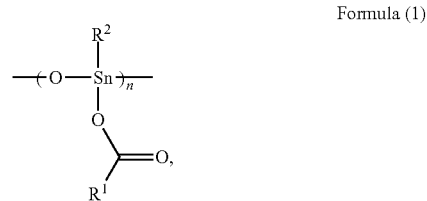

Formula (1)

wherein, in the Formula (1), R$^1$ represents an alkyl group which may be substituted with a halogen atom, R$^2$ is a substituent represented by —O—Sn or —O—C(=O)—R$^1$, and n is an integer equal to or larger than 1, when there are a plurality of R$^1$ and a plurality of R$^2$, the plurality of R$^1$ and the plurality of R$^2$ may be the same or different from each other, with the proviso that at least one fluorine atom is included in the structure represented by the Formula (1).

5. A method of manufacturing the antimony-doped tin oxide according to claim 4, comprising mixing alkyl acid substituted with at least one fluorine atom, tin chloride, and antimony chloride into water.

6. A method of manufacturing a fuel cell separator comprising, on a substrate, an antimony-doped tin oxide film including an alkyl group substituted with at least one fluorine atom,
    wherein an element ratio of fluorine to tin (F/Sn) in the film is 3 or more and 7 or less, the method comprising:
    preparing particles of the antimony-doped tin oxide according to claim 4; and
    spraying the particles onto the substrate and forming a film by aerosol deposition.

* * * * *